(12) United States Patent
Hammacher et al.

(10) Patent No.: US 10,099,865 B2
(45) Date of Patent: Oct. 16, 2018

(54) METHOD AND DEVICE FOR CONVEYING PIECE PRODUCTS

(71) Applicant: LOESCH Verpackungstechnik GmbH, Altendorf (DE)

(72) Inventors: Heinz-Peter Hammacher, Bamberg (DE); Tobias Hetzer, Erlangen (DE)

( * ) Notice: Subject to any disclaimer, the term of this patent is extended or adjusted under 35 U.S.C. 154(b) by 0 days.

(21) Appl. No.: 15/500,884

(22) PCT Filed: Jul. 28, 2015

(86) PCT No.: PCT/EP2015/067287
§ 371 (c)(1),
(2) Date: Jan. 31, 2017

(87) PCT Pub. No.: WO2016/016250
PCT Pub. Date: Feb. 4, 2016

(65) Prior Publication Data
US 2017/0217691 A1 Aug. 3, 2017

(30) Foreign Application Priority Data
Jul. 31, 2014 (DE) .................. 10 2014 215 106

(51) Int. Cl.
*B65G 47/31* (2006.01)
*B65G 47/08* (2006.01)

(52) U.S. Cl.
CPC .......... *B65G 47/31* (2013.01); *B65G 47/082* (2013.01)

(58) Field of Classification Search
CPC .... B65G 47/08; B65G 47/084; B65G 47/086; B65G 47/31; B65G 47/082
(Continued)

(56) References Cited

U.S. PATENT DOCUMENTS 3,805,476 A * 4/1974 Kawamura ............ B65B 21/16
53/246
4,041,677 A * 8/1977 Reid .................... B65B 9/026
198/419.3
(Continued)

FOREIGN PATENT DOCUMENTS

CN 103534182 A 1/2014
DE 10347540 5/2005
(Continued)

OTHER PUBLICATIONS

International Search Report for PCT/EP2015/067287 from the International Bureau; Searching Authority: European Patent Office.

*Primary Examiner* — Mark A Deuble
(74) *Attorney, Agent, or Firm* — Cislo & Thomas, LLP (57) ABSTRACT

A method and a device are created according to the invention for conveying piece products on one or several tracks, which are arranged side by side and substantially parallel to one another, in such a manner that the products are conveyed further having been separated out from a product stream into singles on each of the tracks and then aligned at uniform spacings and/or in groups. In this case, the products are first of all fed on each track as a single-row product stream on a first conveying device at a first speed. The products are then transferred to a second conveying device, which is arranged in the conveying direction of the products behind the first conveying device and receives the products and conveys them further at a second speed which is faster than the first speed, wherein the respectively frontmost product in the product stream is accelerated when being transferred from the first conveying device to the second conveying device and, as a result, by a gap being formed in the conveying direction, is separated off from the product stream. Finally, the separated products are aligned at exactly the precise moment in time and space in the conveying direction on the (Continued)

second conveying device by means of an entrainment device, wherein the entrainment device cooperates with the separated product and is moved forward in the conveying direction at a speed which is proportionate to the second speed in such a manner that the entrainment device brakes the separated product or conveys it further at the second speed or accelerates it.

15 Claims, 3 Drawing Sheets

(58) Field of Classification Search
USPC .................................................. 198/419.3
See application file for complete search history.

(56) References Cited

U.S. PATENT DOCUMENTS

| | | | |
|---|---|---|---|
| 4,296,590 A * | 10/1981 | Focke | B65G 47/32 |
| | | | 198/419.1 |
| 4,355,712 A * | 10/1982 | Bruno | B65G 47/31 |
| | | | 198/459.6 |
| 4,630,725 A | 12/1986 | Steurmer | |
| 4,815,581 A | 3/1989 | Deutschlander | |
| 5,020,655 A * | 6/1991 | Cruver | B65G 47/084 |
| | | | 198/419.1 |
| 5,035,315 A * | 7/1991 | Fukusaki | B65B 23/14 |
| | | | 198/408 |
| 5,147,027 A | 9/1992 | Cruver | |
| 5,667,055 A * | 9/1997 | Gambetti | B65B 21/06 |
| | | | 198/418.7 |
| 6,131,372 A * | 10/2000 | Pruett | B65B 23/12 |
| | | | 198/419.1 |
| 7,533,768 B2 | 5/2009 | Floding et al. | |
| 7,665,598 B2 * | 2/2010 | Begin | B65G 47/082 |
| | | | 198/419.1 |
| 7,874,246 B2 * | 1/2011 | Pryor | A21C 9/085 |
| | | | 198/345.1 |
| 7,874,417 B2 | 1/2011 | Oppici | |
| 2003/0136641 A1 * | 7/2003 | Iwasa | B65B 5/061 |
| | | | 198/419.3 |
| 2005/0108992 A1 | 5/2005 | Wagner et al. | |
| 2013/0239525 A1 | 9/2013 | Hammacher | |
| 2014/0076692 A1 | 3/2014 | Van de Loecht et al. | |
| 2014/0083817 A1 * | 3/2014 | van De Loecht | B65G 47/841 |
| | | | 198/459.8 |
| 2015/0068869 A1 | 3/2015 | Hammacher | |

FOREIGN PATENT DOCUMENTS

| | | |
|---|---|---|
| DE | 10 2010 041 346 A1 | 3/2012 |
| DE | 102011075174 | 11/2012 |
| GB | 2045712 | 11/1980 |
| GB | 2090804 | 7/1982 |
| JP | 2010 168212 | 8/2010 |
| JP | 2010168212 A | 8/2010 |
| WO | WO 2013152798 | 10/2013 |

* cited by examiner

METHOD AND DEVICE FOR CONVEYING PIECE PRODUCTS

This patent application is a national phase entry of PCT Application No. PCT/EP2015/067287, filed Jul. 28, 2015, which is incorporated in its entirety here by this reference.

The invention relates to a method and to a device for conveying piece products on one or several tracks, which are arranged side by side and substantially parallel to one another, in such a manner that the products are conveyed further having been separated out from a product stream into singles on each of the tracks and then aligned at uniform spacings and/or in groups.

The method according to the invention and the device according to the invention for conveying piece products can be used, for example, in conjunction with a packaging machine for packaging the piece products. The products to be conveyed, for example, can be delicate products from the confectionery or long-life bakery products industry, such as, for example, single-layer or multi-layered biscuits, chocolate products and the like. Along with products from the foodstuffs industry, however, technical products are also conceivable such as, for example, electronic or electrotechnical components or modules, machine elements, pharmaceutical or medical products and the like which, as a rule, are produced, packaged and marketed in large quantities.

These types of products, once produced, are usually fed in a more or less unordered and irregular manner in a product stream, in which a plurality of identical products are accumulated abutting against one another, to a packaging machine or to another machine, by means of which the products are conveyed further and processed further. In particular, in the case of packaging machines, it can be necessary, in this case, for the individual products to be fed in an ordered manner, preferably also at uniform, identical spacings with respect to one another, to a packaging station or another further processing station. In this connection, it is consequently necessary to separate the individual products from the fed product stream and product accumulation, this means to separate the product from the product stream into singles and then to convey them further individually, preferably at constant identical spacings with respect to one another, and to supply them to the next processing or packaging station.

In this connection, it can also be desirable for the individual products to be conveyed further in uniform product groups. Said product groups can extend, for example, in the longitudinal direction, i.e. in the conveying direction, such that the individual products in the product group are arranged one behind another. As an alternative to this or in addition to it, said product groups can also extend transversely or at an angle with respect the conveying direction, i.e. beyond several conveying tracks that are arranged side by side such that the products of one certain product group are arranged substantially side by side. As a result of combining such longitudinally and transversely extending groups, ultimately arbitrary product samples in the form of a product matrix or a product carpet can also be formed.

DE 10 2010 041 346 A1 discloses, for example, a method and a device for filling a multiple-row packaging tray with piece products, in particular a so-called tray loading packaging machine. In the case of said known packaging machine, the products are conveyed on several tracks that are arranged substantially parallel to one another, the individual streams of products being synchronized on the tracks with one another such that, in each case, one product can be transferred to a multi-row packaging tray from one track substantially simultaneously with, in each case, one product from the other tracks. For this reason, the products are initially separated from a fed product stream into singles. For the desired simultaneous transfer of the products from the tracks arranged side by side to the packaging tray, the speed of the further conveying of the individual products on the tracks is controlled and synchronized by means of controllable or regulatable individual conveying devices, in particular individual conveyor belts which are arranged one behind another in the conveying direction of the product stream and are realized such that they only convey one single product in each case. Product groups, which, for example, consist in each case of a row of precisely aligned single products that are arranged side by side, can be formed in this way. At the end of the conveying section, said single-row product group is transferred to the packaging tray, the several single products located side by side being transferred simultaneously into the compartments of the packaging tray that are arranged side by side. The next single-row product group is then fed at a distance from the preceding product group and is transferred to the next row of receiving compartments of the packaging tray. By means of the named several speed-controlled individual conveying devices (conveyor belts), which are connected one behind another and are arranged side by side, the products located side by side of one row or group are fed at exactly the precise moment in time and space to the receiving device connected downstream (e.g. a packaging tray for the ordered reception of the individual products).

Said known conveying system, however, is structurally expensive on account of the plurality of individual conveying devices (individual conveyor belts) needed and it requires a high level of expenditure as regards the control and regulation of the conveyor belts to achieve the desired synchronization. On account of the plurality of individual conveyor belts needed, said system is also linked with a large space requirement. All the previously mentioned factors ultimately also contribute to said known system being very cost-intensive.

In order to separate individual products from a continuous product stream or product accumulation into singles, the prior art discloses, over and above this, wheel-like or roller-like-conveying devices, on the circumference of which entrainment means are mounted. When said conveyor wheel rotates, the entrainment means in each case engage the individual product that is frontmost in the product accumulation in the conveying direction (or simultaneously several frontmost products located side by side) and separate said product from the accumulation by accelerating it. In the case of such types of known rotary conveying devices, the entrainment means are typically mounted in a fixed manner and are aligned radially with respect to the center of the rotational axis of the conveyor. In this case, the entrainment means are realized in part in a resilient manner such that they yield slightly when they cooperate with the relevant product for conveying it further. The aim of this is that the products are not damaged or at any event are less damaged when they are engaged by the relevant entrainment means. In particular, in the case of delicate products from the foodstuffs industry, such as biscuits or other baked goods, damage to the products caused by rigid entrainment means presents a big problem. However, even in the case of resilient entrainment means, product damage is still frequently experienced.

To reduce or avoid said problem, WO 2013/152798 A1 discloses mounting the entrainment devices attached to the conveying devices so that they are pivotable in a controlled manner in the conveying direction of the products. Said entrainment means engage, in this case, between two consecutive products in the product stream and guide them in such a manner that the products, separated from the product stream in a controlled manner and aligned at exactly the precise moment in time and space, are conveyed further spaced apart from one another at uniform spacings and/or in groups.

However, all the afore-described entrainment devices can only be used, in principle, when sufficient space or a gap, into which the entrainment means are able to engage or dip, is present between the consecutive products. Said known entrainment devices are consequently suitable, in particular, for substantially round products (e.g. biscuits) where, even when the products are located one behind another abutting against one another in the accumulation, there are spaces or gaps between consecutive products in the two lateral regions of the conveyor track into which the entrainment means can dip in order to engage the relevant product on its circumference. The above-described entrainment devices are therefore less suitable or not suitable for irregularly shaped products and in particular not for (right-)angled products which abut against another one in a product accumulation along their side edges over a fairly large region and consequently do not comprise any or hardly any lateral spaces or gaps for engagement of the entrainment means.

In order to align the individual products, which are conveyed on several conveyor tracks arranged side by side, in rows with one another, over and above this the prior art discloses arranging alignment rails on the conveyor tracks. In this connection, for example, a beam is pivoted into the conveyor track, against which the conveyed products strike and by way of which they are aligned. However, the relative spacings between each of the product rows can consequently not be influenced during operation or can only be influenced in a very limited manner. In addition, in this connection, only one alignment of complete product rows is, as a rule, possible. Over and above this, as a rule alignment rails can only be used when there is a sufficiently large gap into which the alignment rail can be pivoted in each case on all the tracks between the fed product rows.

Proceeding from said known devices and methods, the object underlying the invention is to overcome the above-described disadvantages of the prior art and consequently to create an improved method and an improved device, by means of which piece products are able to be conveyed further, having been separated out from a product stream or product accumulation into singles and then aligned at identical or uniform spaces with respect to one another and/or, where applicable, in groups of products. This is to be possible in particular even in the case of changing load situations, for example when the products are fed on the input side in an irregular, patchy or continuous product stream. Consequently, a device and a method for equalizing the spacings between products, for forming product groups and for aligning product rows or groups are to be created. Insofar as the products are conveyed on several tracks arranged side by side, the individual products located side by side on the tracks are to be aligned with one another such that uniform product rows and, where applicable, corresponding product groups or product samples are formed. In this way it is to be made possible to feed the individual products or product rows or product groups, which follow one after another in the product stream, in a controlled manner at exactly the precise moment in time and space to a following receiving device or further processing device. Finally, it is also an object of the present invention to accomplish conveying of products that as regards shape are irregular, non-round or (right-)angled. The conveying, in this case, is to be effected overall such that the products are treated in a gentle manner and in particular are not damaged.

Said object is achieved according to the invention by a method for conveying piece products for a single-row product stream, i.e. a product stream on one track, as well as by a corresponding method for conveying products on several tracks that are arranged side by side and substantially parallel to one another. Over and above this, said object is achieved according to the invention by a device for conveying piece products on one or several tracks that are arranged side by side and substantially parallel to one another.

A method and a device are consequently created according to the invention for conveying piece products on one or several tracks that are arranged side by side and substantially parallel to one another in such a manner that the products are separated out from a product stream into singles on each of the tracks and then are conveyed further being at uniform spacings and/or aligned in groups. In this case, the products are first of all fed on each track as a single-row product stream on a first conveying device at a first speed. The products are then transferred to a second conveying device, which is arranged behind the first conveying device in the conveying direction of the products and which receives the products and conveys them further at a second speed which is faster than the first speed, wherein the respectively frontmost product in the product stream is accelerated when being transferred from the first conveying device to the second conveying device and, as a result, by a gap being formed, is separated off from the product stream, in the conveying direction. Finally the separated products are aligned on the second conveying device in the conveying direction at exactly the precise moment in time and space by means of an entrainment device, wherein the entrainment device cooperates with the separated product and is moved forward in the conveying direction at a speed which is proportionate to the second speed in such a manner that the entrainment device brakes the separated product or continues to convey it at the second speed or accelerates it further.

In a first preferred embodiment of the invention, the product separated from the product stream is aligned on the second conveying device at exactly the precise moment in time and space in such a manner that the products or the product stream are accumulated on the first conveying device first of all by means of a first entrainment device which cooperates with the front side of the frontmost product in the product stream in the conveying direction. The accumulated products are then released by the first entrainment device for the transfer to the second conveying device by the first entrainment device freeing itself from the product accumulation and being moved forward in the conveying direction at a speed which is faster than the first speed of the first conveying device.

The first entrainment device is then moved in the region of the second conveying device in the conveying direction at a speed which is equal to or slower than the second speed of the second conveying device such that the first entrainment device cooperates in the conveying direction with the front side of the product separated from the product stream by said product being moved from behind in the conveying direction toward the first entrainment device and running up against the same, i.e. is braked by the same in relation to the second speed of the second conveying device. Said single product is then moved further in the conveying direction at the speed of movement of the first entrainment device.

Once the respectively frontmost product of the product stream has been separated from the product stream when being transferred from the first to the second conveying device, the following, further products in the product stream are accumulated once again on the first conveying device by a second entrainment device engaging in the gap formed between the preceding, frontmost separated product and the further product stream and cooperating in the conveying direction with the front side of the next frontmost product in the product stream. As beforehand, said next frontmost product in the accumulated product stream is then released by the second entrainment device for transfer to the second conveying device by the second entrainment device freeing itself from said frontmost product in the conveying direction and being moved forward in the conveying direction at a speed which is faster than the first speed of the first conveying device. On account of said release of the frontmost accumulated product by means of the second entrainment device, said product, once again when being transferred to the second conveying device, is accelerated and as a result, by once again forming a gap in the conveying direction, is separated from the product stream.

When the second entrainment device is then moved (as the first entrainment device beforehand) in the region of the second conveying device in the conveying direction once again at a speed which is slower than the second speed of the second conveying device, the product separated last from the product stream runs in the conveying direction once again from behind against the second entrainment device and runs against the same such that the second entrainment device cooperates once again with the front side of the separated single product and brakes it in relation to the second speed of the second conveying device.

Said afore-described operation is repeated in a corresponding manner for each further, following product in the fed product stream, i.e. each further frontmost product from the accumulated product stream is accelerated when being transferred from the first conveying device to the second conveying device and, as a result, by a gap being formed, is separated from the product stream. The relevant entrainment device, which has cooperated initially with the respective frontmost product for accumulating the product stream, releases said product by being moved forward in the conveying direction at a speed which is faster than the first speed of the first conveying device on which the product stream is fed. The relevant entrainment device is then braked in the region of the second conveying device to a speed which is equal to or slower than the second speed of the second conveying device such that the product released beforehand from the product stream by said entrainment device once again runs up against said entrainment device and is braked by the same by said entrainment device cooperating with the front side of the product.

In a second preferred embodiment of the invention, it can be provided that the product separated from the product flow does not approach the entrainment device from behind in the region of the second conveying device and run up against said entrainment device which beforehand accumulated the product stream fed on the first conveying device. In said second embodiment, it can rather be provided that the product separated from the product flow is engaged in the conveying direction from behind, i.e. at its rear side, by an entrainment device which is moved in the region of the second conveying device in the conveying direction at a speed that is equal to or faster than the speed of the second conveying device such that the named entrainment device pushes the relevant separated product from behind.

In each of the afore-described embodiments of the invention, the achievement is that the conveyed individual products are aligned on the conveyor track by the relevant entrainment devices at exactly the precise moment in time and space as the products are controlled by the entrainment device, guided in a controlled manner and, as required, accelerated or braked on the second conveying device. As a result of the entrainment guiding system, the individual products are consequently not transferred from the first conveying device to the second conveying device simply in an uncontrolled manner but in a manner that is precisely positioned and aligned so that, following the second conveying device, they are able to be transferred at exactly the precise moment in time and space to the following further processing device.

Said advantages according to the invention are useful in particular in the case of a multi-track embodiment where the products are conveyed on several tracks arranged side by side and are transferred to a further processing device. In this case, the consecutive conveying devices and in particular the entrainment devices which engage in the product stream and cooperate with the individual products, are controlled on the tracks that extend side by side such that the individual product streams are synchronized with one another on the several tracks in such a manner that, in each case, one product on one track, after having been separated into singles from the product stream, is aligned substantially with the respective products on individual selected tracks or on all of the other tracks such that the products on the relevant tracks are arranged substantially in a row side by side in a direction perpendicular to or at an angle to the conveying direction of the products. In the case of the multi-track embodiment, the achievement consequently is that the products located side by side on the tracks are aligned with one another at a higher degree of precision perpendicular to or at an angle to the conveying direction, by being accelerated or delayed in a targeted manner by the entrainment devices on the individual tracks such that the products located side by side on the several tracks are able to be transferred at the end of the conveyor section in a synchronous manner, i.e. aligned at exactly the precise moment in time and space, to a following further processing device or a product receiving means.

By means of the device according to the invention and the method according to the invention, it can finally also be achieved in particular that not only (circular) round products but also irregular or unshapely or (right-)angled products are able to be conveyed and aligned in a precise manner. This is achieved, in particular, as a result of the respectively frontmost product of an accumulated product stream being able to be separated from the product stream by means of consecutive (belt) conveying devices by a gap or a clearance or a space being formed, the entrainment devices, which subsequently take care of the precise alignment of the individual products, being able to engage in said formed gap and consequently take hold of the products and guide them in a controlled manner.

Further details and advantages of the invention are produced from the following detailed description of exemplary embodiments by way of the accompanying drawings.

Figure 1:
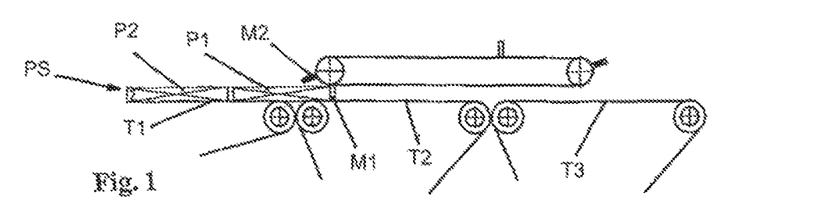
FIG. 1 shows a schematic representation of a view from the side of the conveying device according to the invention in a first position.

A schematic representation of a view from the side of the conveying device for piece products P or P1-Pn is shown in FIG. 1. In this connection, the products P are fed as a product stream PS on a first conveying device T1 to the overall device. In FIG. 1, said products P1-Pn coming from the left are fed on a first conveying device T1, e.g. a conveyor belt, and are run to the right through the device. At the right-hand end of the overall device, the products P are then transferred to a device for further processing, for example for packaging the products.

FIG. 1 shows a schematic representation on the input side of two products P1, P2 which are located one behind another in the accumulation and typically impact against one another. Following the product P1 shown, i.e. coming from the left in the figures, further products P3-Pn then follow in the product accumulation PS, as can also be seen schematically from FIGS. 2 to 9. Said products P can be, for example, long-life baked goods, for example biscuits. As has been explained in the introduction, these types of products can have, for example, a substantially round form, in the present device, however, in particular also non-round, irregularly shaped and/or angular products being able to be conveyed.

In the device according to the invention, the individual products P1-Pn are gradually separated from the continuously or intermittently fed product accumulation or product stream PS, aligned, conveyed further and fed to a further processing device connected downstream by means of several, but at least two conveying devices, such as, for example, conveyor belts T1, T2, T3, as well as by means of several, but at least two entrainment devices M1, M2, M3. As can be seen from FIG. 1, several entrainment devices M1, M2, M3 are arranged above two or more conveying devices T1, T2, T3 for this purpose. The first, second and third conveying devices T1, T2, T3, in this case, can be circulating band conveying devices, belt conveying devices or chain conveying devices and in the present case are preferably conveyor belts. Said conveyor belts run at different speeds, typically the speed v2 of the second conveyor belt T2 being faster than the speed v1 of the first conveyor belt T1 on the input side. As is explained further in more detail below, the third conveyor belt T3 can be provided as an option. In said case, the speed v3 of the third conveyor belt T3 is typically faster than the speed v2 of the second conveyor belt T2.

The entrainment devices M1, M2, M3 are attached to circulating drive bands, drive belts or drive chains and can either be fastened in a rigid, fixed manner or can be realized so as to be pivotable, then being actuated, for example, over curved tracks. The first, second and/or third entrainment means M1, M2, M3, in this case, can be moved independently of one another, i.e. they are actuated and driven independently of one another. In this connection, the so-called racetrack principle is applied such that a corresponding so-called multi-lane racetrack is referred to in dependence on the number of drive belts on which the respective entrainment means M1 or M2 or M3 are located. Therefore, insofar as, for example, three drive belts that are arranged side by side but are actuated independently from one another are provided for the entrainment devices, a three-lane racetrack is referred to. In this case, the first entrainment device M1 is situated on a first drive belt, the second entrainment device M2 is situated on a second drive belt and the third entrainment device M3 is situated on a third drive belt. Each drive belt, in this case, can comprise respectively just one single entrainment means or several entrainment means. In the event of several entrainment means, these are then arranged at fixed spacings from one another on the drive belt and, as regards their movement, are consequently independent of one another and synchronous with one another. Each of the above-mentioned variants or combinations thereof are conceivable for the conveying device according to the invention.

The use of entrainment means M1, M2, M3 which are actuated by means of a curved track, i.e. typically mounted so as to be pivotable in the conveying direction of the products, is recommended for improved and more reliable engagement, i.e. the individual entrainment means M1, M2, M3 pivoting or dipping into a gap L or a space which is created when an individual product P is separated from the product stream PS on account of the acceleration of the product P (as is described further in more detail below). These types of actuated entrainment means can also dip into the respective gap L without any problem even in the case of very small gaps L, substantially without touching the product P and consequently, where applicable, without damaging it. Said embodiment is advantageous in particular in the case of tall or thick products P.

In a further advantageous realization variant of the overall device, it is possible for the conveying devices and in particular the second conveying device (conveyor belt T2) to comprise vacuum devices which suck up the conveyed products P and hold them in this way on the conveyor belt by increasing the friction between product and conveyor belt. In the case of said embodiment, the acceleration of the product P can be significantly increased by way of a speed jump, i.e. for example at a transition from the first conveyor belt T1 to the second conveyor belt T2. In addition, the reliability of conveying the product at the gap L created as a result of the speed jump between the remaining fed product stream PS and the product P separated therefrom can be increased as a result of corresponding vacuum devices on the second conveyor belt T2 (as is explained further below).

All the components described beforehand are situated in a corresponding manner substantially in a single-row conveying device according to the invention where the products are fed substantially as a single-row or single-row product stream PS and are run continuously through the conveying device substantially on a linear track. In practice, however, to increase output, as a rule multi-track conveying devices are provided where several tracks are arranged side by side and substantially parallel to one another. On each of said several tracks, the products are conveyed substantially in the same manner as described above, and each of said several tracks includes substantially the same above-described components as in the single-row version.

In the case of the multi-track embodiments, the individual tracks can operate independently of one another, i.e. are controlled and driven individually in each case. As an alternative to this, however, the several tracks can also be controlled and driven together or in groups. Insofar as the individual products on the tracks arranged side by side are to be transferred together or at the same time and aligned with one another substantially in a row to a following further processing device at the end of the conveying section, it is essential in the case of the multi-track embodiment for the individual conveyor tracks and in particular the first, second and third conveying devices T1, T2, T3 arranged on each conveyor track as well as the respective first, second and third entrainment devices M1, M2, M3 to be controlled such that the individual product streams on the relevant tracks are synchronized with one another in such a manner that in each case one product on a track, after being separated into singles from the product stream, is aligned substantially with the respective products on individual selected tracks or on all of the other tracks such that the products on the relevant tracks are aligned in a row or are arranged side by side for the transfer to the following further processing device, a row of this type, depending on the requirement, running in a direction perpendicular to or at an angle to the conveying direction of the products.

As has already been mentioned with reference to FIG. 1, the individual products P1, P2 . . . Pn in a product stream PS, coming from the left in the drawing, are fed into the overall device on the conveyor belt T1. The speed v1 of the conveyor belt T1, in this case, can be in advance of the product throughput, the speed v1 being able to be substantially identical to the product throughput (in quantity per unit time) times the product length times the advance.

By means of a first entrainment means M1, which projects into the conveying path of the products P, the products P are accumulated in the product stream PS (see FIG. 1). In this connection, the first entrainment means M1 essentially stands still or is moved in the conveying direction at a speed vM1 which is slower than the speed v1 of the first conveyor belt T1. In this way, the products P in the product stream PS run against the entrainment means M1, the entrainment means M1 cooperating in the conveying direction with the front side of the frontmost product P1 in the product stream PS. Insofar as several product tracks are arranged side by side, the same applies to the first entrainment means M1 on all product tracks. In this connection, the respective first entrainment means M1 of the several tracks can be synchronized with one another such that the respectively frontmost products P1 on all the relevant tracks are already aligned with one another here substantially perpendicular to the conveying device and are situated at a level. As an alternative to this, it can be provided on each track in place of separate first entrainment means M1 that the entrainment means M1 extends beyond all the tracks, for example in the form of a crossbeam, as a result of which all the first products P1 on the relevant tracks are then situated at a level in all cases perpendicular to the running direction. The advantage of said last-named embodiment is that control and synchronization of the individual entrainment means M1 of the several tracks with one another is not necessary. In every case, the entrainment means M1 can already bring about at said position on the conveyor tracks, at exactly the precise moment in time and space, an alignment of the individual products in the conveying section or in the conveying direction, in particular for forming regular spacing between the consecutive products.

Figure 2:
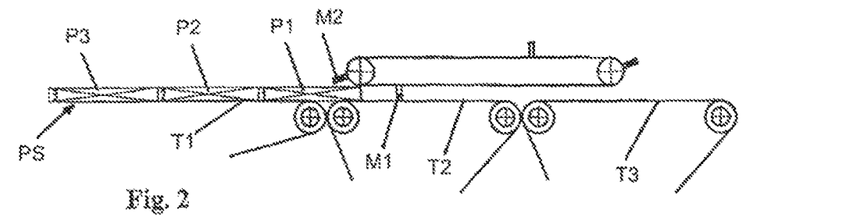
FIGS. 2-5 show the conveying device according to the invention from FIG. 1 in a sequence of further positions.

As soon as the products P on the first conveyor belt T1 have been accumulated correctly by means of the first entrainment means M, the accumulated products P can be released by the first entrainment means M1 for transfer to the second, subsequent conveying device (conveyor belt T2). As can be seen in FIG. 2, the entrainment means M1 is moved quickly to the right for this, i.e. in the conveying direction, at a speed vM1 which is faster than the speed v1 of the first conveyor belt T1.

The released products can now consequently be moved further initially at the speed v1 of the conveyor belt T1, the respective frontmost product (product P1 in FIG. 2) then being pushed over the belt transition, i.e. transferred to the subsequent second conveying device (conveyor belt T2). The conveyor belt T2 is moved at a speed v2 which is faster than the speed v1 of the first conveyor belt T1. As soon as the frontmost product P1 is then situated to a greater extent on the conveyor belt T2, said product P1 is accelerated to the speed v2 of the second conveyor belt T2. As a result of said speed jump, a gap L or a space or a clearance is created in the conveying direction between said frontmost product P1 and the next product P2 following in the product stream PS, which is still situated predominantly on the first conveyor belt T1 and consequently continues to be moved only at the slower speed v1 of the first conveyor belt T1 (see FIG. 3). The previous frontmost product P1 of the product stream PS is separated in this way from said product stream such that now the following product P2 is the frontmost product in the product stream PS.

Figure 3:
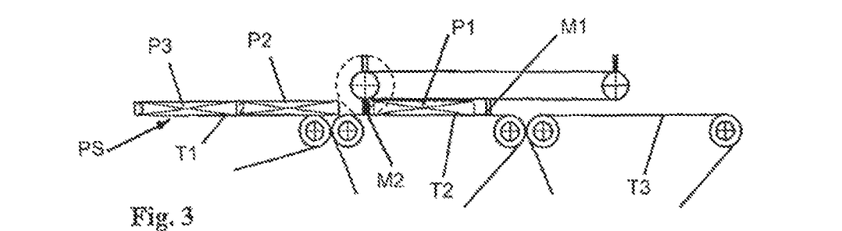
Figure 4:
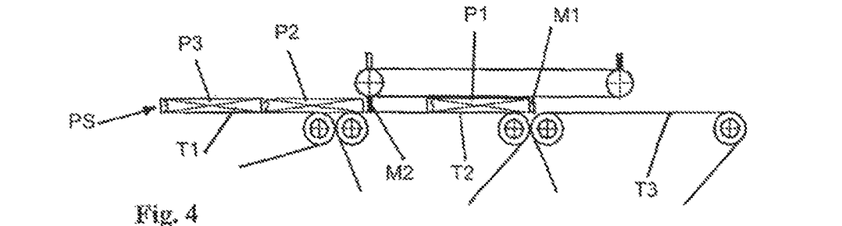
Figure 5:
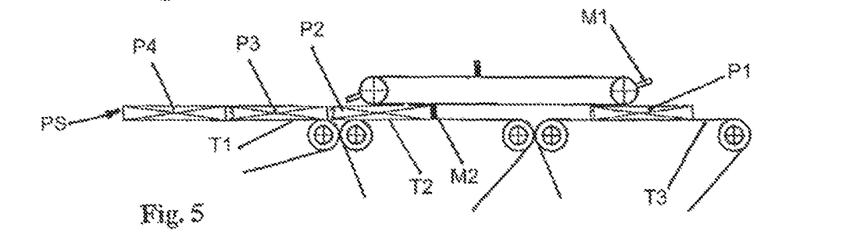
Figure 6:
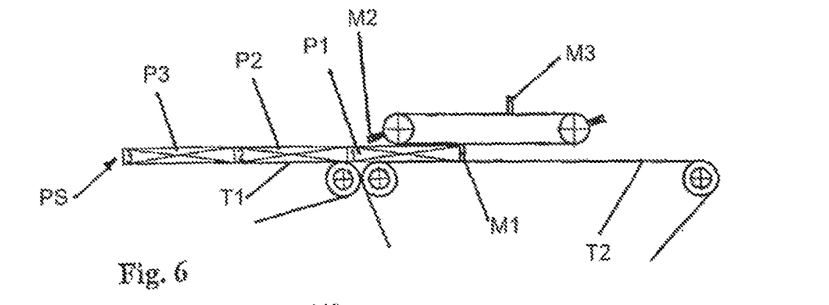
FIGS. 6-9 show another embodiment of the conveying device according to the invention in a corresponding sequence of different positions.

As can be seen from FIGS. 3 to 5, the following further products P2-Pn in the product stream PS are now once again accumulated on the first conveyor belt T1, after the preceding product P1 has been separated from the product stream PS, as described beforehand. For this purpose, a second entrainment means M2 engages in the gap L which is created between the preceding separated product P1 and the remaining, further product stream PS. In this case, the second entrainment means M2 cooperates once again in the conveying direction with the front side of the next frontmost product P2 in the product stream PS, i.e. the product stream PS runs in the conveying direction against the entrainment means M2, namely once again on account of being conveyed by the first conveyor belt T1 at the speed thereof v1. In a manner corresponding to the entrainment means M1 beforehand, the entrainment means M2 remains still or is moved at a speed vM2 which is slower than the speed v1 of the first conveyor belt T1. The entrainment means M2 consequently holds back the following products P2-Pn in an accumulation once again. The same applies to the entrainment means M2 in further product conveying tracks which are present, where applicable, and are arranged side by side, the individual entrainment means M2 of the individual tracks preferably once again being synchronized with one another such that they align the now respectively frontmost products P2 of the several tracks with one another substantially in a row transversely beyond the tracks.

In a manner corresponding to how it has been described beforehand for the first entrainment means M1, the products P2-Pn accumulated on the first conveyor belt T1 by the entrainment means M2 are then released by the second entrainment means M2 for transfer to the second conveyor belt T2. In this case, the second entrainment means M2 is moved forward once again in the conveying direction at a speed vM2 which is faster than the speed v1 of the first conveyor belt T1. As soon as the now frontmost product P2 then passes by way of a fairly large part into the region of the second conveyor belt T2, said product P2 is separated from the product stream PS on account of the faster speed v2 of the second conveyor belt T2 and is accelerated by means of the second conveyor belt T2, as a result of which a gap L is now formed between said separated product P2 and the further products P3-Pn remaining in the product accumulation PS.

As has been explained above in conjunction with FIGS. 1 and 2, the first entrainment means M1, after the accumulation of the product stream PS, is freed from the engagement with the frontmost product P1 of the product stream PS and is moved quickly to the right (in FIG. 2) into the region of the second conveyor belt T2. Here, the entrainment means M1 is braked and is then moved further at a speed vM1 which at most is equal to, but preferably slower than the speed v2 of the second conveyor belt T2. As a result, the first product P1, separated beforehand from the product accumulation PS, on account of being conveyed on the second conveyor belt T2, runs from behind against the first entrainment means M1 such that the first entrainment means M1 cooperates in the conveying direction with the front side of the separated product P1 (cf. FIG. 4). The entrainment means M1 consequently holds back the product P1 and aligns it at exactly the precise moment in time and space such as is necessary for conveying it further and/or transferring it to a further processing device connected downstream.

As an option, a third conveyor belt T3 can be provided connecting to the second conveyor belt T2, to which third conveyor belt the products P are transferred from the second conveyor belt T2. The conveyor belt T3 runs typically at a speed v3 which is equal to or faster than the speed v2 of the second conveyor belt T2. The speed v3 of the third conveyor belt T3 ensures that the products P are at specific spacings in the conveying direction in dependence on the throughput. The speed v3 of the third conveyor belt T3, in this case, is typically equal to the product throughput (in quantity per unit time) times the distance between product centers in the conveying direction.

The frontmost product P1, which is separated from the product accumulation PS and is initially held back in the region of the second conveyor belt T2 or, insofar as present, in the region of the third conveyor belt T3, by the entrainment means M1 and is aligned correctly as a result, as has been described above in detail, is then released from the engagement with the entrainment means M1 in the region the second conveyor belt T2 or in front of the end thereof or, insofar as present, in the region of the third conveyor belt T3, or in front of the end thereof, by the entrainment means M1 being moved forward in the conveying direction and consequently away from the product P1 at a speed vM1 which is faster than the speed v2 of the second conveyor belt T2 or the speed v3 of the third conveyor belt T3. Said release of the product P1 can also be effected as an alternative to this or in addition to it as a result of the first entrainment means M1 simply moving out of the conveying section, i.e. out of the engagement with the product P1. This is a typical movement of an entrainment means attached to a circulating drive belt, as a result of which the entrainment means pivots out of the conveying section and back again to the drive belt on the side located opposite the conveying section, i.e. is moved to the start of the conveying section (as can be seen in FIG. 5). At the start of the conveying section, the relevant entrainment means can then pivot into the conveying section again and once again bring about a product accumulation in a manner corresponding to as beforehand and then take hold of a next product P separated from the product accumulation PS and hold it back and consequently align it.

In the multi-track embodiment of the conveying device, the products P1 conveyed on the tracks arranged side by side and located in a row side by side are released as a result of release, preferably simultaneously, from the engagement with the respective entrainment means M1 on each of the tracks in order to be able to be transferred, for example simultaneously and in an ordered manner, as a transversely running product row to a further processing device connected downstream. In this way, a product pattern or a product matrix or a product carpet can be created with tracks and rows that are arranged and aligned in a manner that is as required and correct.

In an alternative embodiment of the conveying device according to the invention which is shown in FIGS. 6 to 9, it can be provided that the individual product separated from the product stream is not aligned by the leading first entrainment means M1, against which the product P1 runs from behind. In said alternative embodiment, it can be provided rather that the separated product P1 (cf. FIGS. 6 and 7) is aligned by a trailing entrainment means M2 which runs up against the product P1 from behind in the conveying direction and as a result pushes it. It can be provided specifically in this case that the second entrainment means M2 is moved in the region of the second conveyor belt T2 in the conveying direction at a speed vM2 which is at least equal to, but preferably faster than the speed v2 of the second conveyor belt T2. In this way, the second entrainment means M2 cooperates in the conveying direction with the rear side of the leading product P1 that was previously separated from the product stream PS and as a result pushes it.

Figure 7:
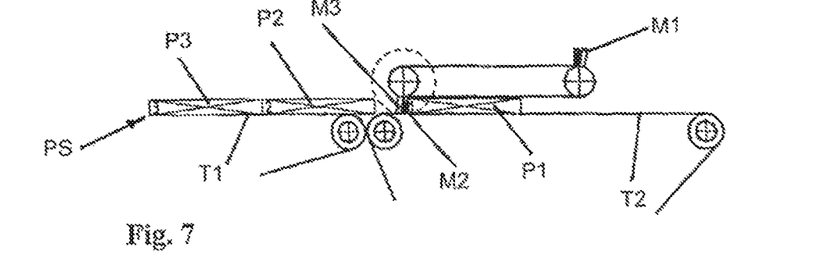
Figure 8:
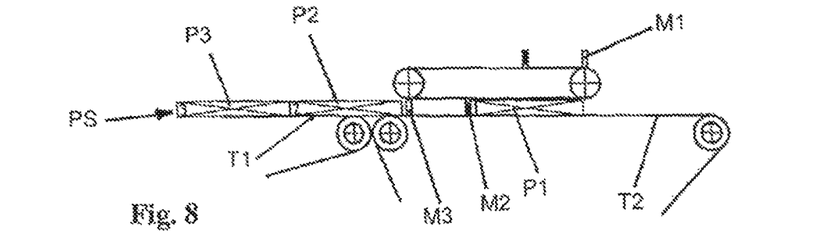

In a further development of said alternative embodiment, it can be provided that, simultaneously or in rapid succession, two entrainment means, namely a second entrainment means M2 and a third entrainment means M3, pivot into the gap L which is created as a result of separating the frontmost product P1 from the product stream PS (cf. FIG. 7). The third entrainment means M3 backs up the further products P2-Pn in the product stream PS on the first conveyor belt T1, once the respective preceding frontmost product P1 of the product stream PS has been separated, as described above, from the product stream PS. In this case, the third entrainment means M3 cooperates in the conveying direction with the front side of the next frontmost product P2 in the product stream PS (cf. FIG. 8).

As described beforehand, the second entrainment means M2 is moved in the meantime in the region of the second conveyor belt T2 in the conveying direction at a speed vM2 which is at least equal to and preferably faster than the speed v2 of the second conveyor belt T2. As a result, the second entrainment means M2 cooperates in the conveying direction with the rear side of the preceding separated product P1 and consequently pushes it from behind, as a result of which it once again correctly aligns it (cf. FIG. 8).

Figure 9:
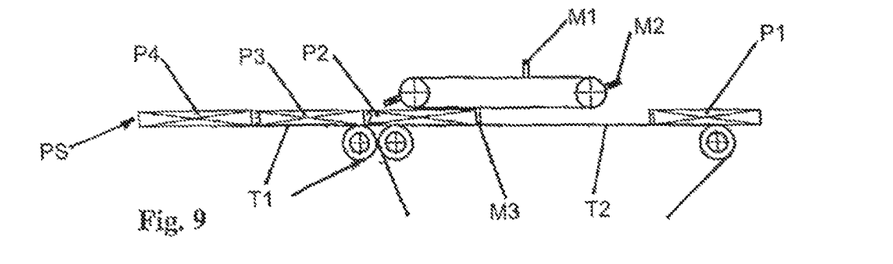
Figure 10:
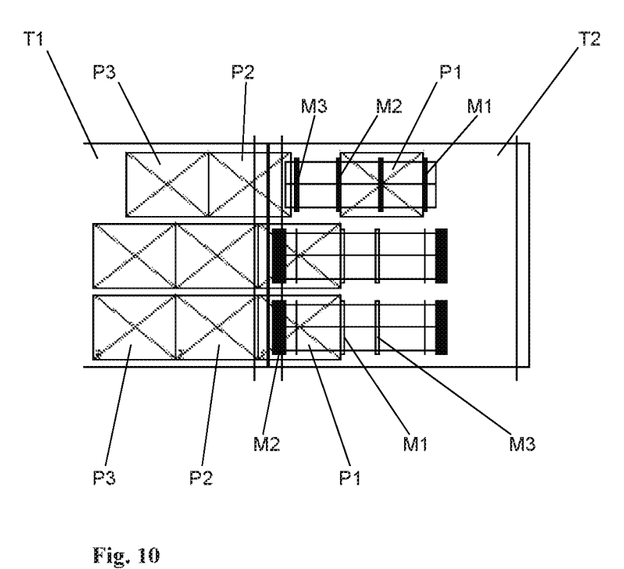
FIG. 10 shows a plan view of an embodiment of the present invention.

As shown in FIG. 9, the separated product P1 is finally released from the engagement with the second entrainment means M2 in the region of or at the end of the second conveyor belt T2, by said conveyor belt being moved further in the conveying direction at a speed vM2 which is slower than the speed v2 of the second conveyor belt T2. As an alternative to this or in addition to it, the release of the product can be effected once again P1 as a result of the second entrainment means M2 being moved out of the conveying path of the second conveyor belt T2, for example by the entrainment means M2 being pivoted out of conveying section by means of the drive belt and running back again to the start of the conveying section on the drive belt.

The further products P2-Pn accumulated within the framework of said alternative embodiment of the third entrainment means M3 in the following product stream PS are finally released gradually and individually by the third entrainment means M3 for transfer to the second conveyor belt T2, substantially in the manner corresponding to that described above for the first entrainment means M1 and the second entrainment means M2. For said product release, the third entrainment means M3 is freed from the engagement with the now frontmost product P2 of the accumulated product stream PS by being moved forward in the conveying direction at a speed vM3 which is faster than the speed v1 of the first conveyor belt T1. The relevant frontmost product P2 of the product accumulation PS is consequently once again transferred to the second conveyor belt T2 and accelerated, once again a gap being formed between said separated product P2 and the next frontmost product P3 following in the product accumulation. A next entrainment means can then engage in said formed gap in the further sequence in a manner corresponding to that described above.

In the case of said previously described alternative embodiment, in dependence on requirement and in dependence on the geometric realization, it is possible, as an option, to attach, for example, the first entrainment means M1 and the third entrainment means M3 on the same drive belt. By way of said drive belt, the first entrainment means M1 and the third entrainment means M3 are consequently moved simultaneously and at a fixed spacing with respect to one another. When the first entrainment means M1 then, for example, releases the product and is moved accordingly forward, the third entrainment means M3 is also able to be moved at the same time. As soon as a sufficient gap is created between the separated product and the following product stream, the third entrainment means M3 can then dip into said gap between the products substantially simultaneously or together with the second entrainment means M2.

Along with the advantages described in the introduction which are obtained by the conveying device according to the invention, it is also possible to increase, for example, the precision of the positioning of the products as a result of the procedure according to the invention for releasing the products when the product speed and the conveyor belt speed are substantially equal or approximately equal when the products are discharged. Over and above this, as a result of controlling the release movement in a suitable manner, it is possible to create almost arbitrary spacings between the products or product rows (in the case of the multi-track realization) that are gradually discharged one after another.

The invention claimed is:

1. A method for conveying piece products in such a manner that the piece products are separated out from a single-row product stream into single piece products that are then conveyed further at uniform spacings or aligned in groups, characterized by the following steps:

feeding the single-row product stream, formed by the piece products, on a first conveying device at a first speed;

transferring the piece products to a second conveying device, which is arranged downstream relative to the first conveying device in a conveying direction of the piece products and on which the piece products are conveyed at a second speed that is faster than the first speed, wherein the respectively frontmost piece product in the single-row product stream is accelerated when being transferred to the second conveying device and, as a result, by a gap being formed, is separated off from the single-row product stream in the conveying direction;

providing a first entrainment device and a second entrainment device that are actuatable and drivable independently of one another;

aligning the now separated respectively frontmost piece product, having a front side and rear side, at exactly the precise moment in time and space in the conveying direction on the second conveying device, with at least one of the first or second entrainment device, which cooperates with the now separated respectively frontmost piece product and which is moved forward in the conveying direction at a speed that is proportionate to the second speed in such a manner that the first entrainment device is capable of braking the now separated respectively frontmost piece product, conveying the frontmost piece product further at the second speed, or accelerating the frontmost piece product, accumulating the piece products on the first conveying device by means of the first entrainment device which cooperates in the conveying direction with the front side of the respectively frontmost piece product in the single-row product stream; and releasing of the piece products from the first entrainment device for transferring the piece products to the second conveying device, by the first entrainment device being moved forward in the conveying direction at a third speed which is faster than the first speed of the first conveying device;

accumulating further products, defined as what remains of the single-row product stream on the first conveying device, by means of the second entrainment device, once the respectively frontmost piece product of the single-row product stream has been separated from the single-row product stream when being transferred to the second conveying device, wherein the second entrainment device engages in the gap formed between the now separated respectively frontmost piece product and the further products and cooperates in the conveying direction with a front side of a next frontmost piece product of the further products in the single-row product stream while the now separated respectively preceding frontmost product is continuously conveyed further on the second conveying device; and releasing of the further products from the second entrainment device for transferring the piece products to the second conveying device, by the second entrainment device being moved forward in the conveying direction at a speed which is faster than the first speed of the first conveying device.

2. The method as claimed in claim 1, characterized in that the first entrainment device is moved in a region of the second conveying device in the conveying direction at the third speed which is equal to or slower than the second speed of the second conveying device, such that the first entrainment device cooperates in the conveying direction with the front side of the respectively frontmost piece product separated from the product stream by the respectively frontmost piece product running up against the first entrainment device in the conveying direction.

3. The method as claimed in claim 2, characterized by the following further step:

releasing of the now separated respectively frontmost piece product from engaging with the first entrainment device in a region of the second conveying device, by the first entrainment device being moved forward in the conveying direction at a speed that is faster than the second speed of the second conveying device, or by the first entrainment device being moved out of the conveying direction of the second conveying device.

4. The method as claimed in claim 1, characterized in that the second entrainment device is moved in a region of the second conveying device in the conveying direction at a fourth speed which is equal to or faster than the second speed of the second conveying device, such that the second entrainment device cooperates in the conveying direction with the rear side of the respectively frontmost piece product separated from the single-row product stream, and as a result pushes the respectively frontmost piece product.

5. The method as claimed in claim 4, characterized by the following further step:

releasing of the now separated respectively frontmost piece product from engaging with the second entrainment device in a region of the second conveying device, by the second entrainment device being moved forward in the conveying direction at a speed that is slower than the second speed of the second conveying device, or by the second entrainment device being moved out of the conveying direction of the second conveying device.

6. The method as claimed in claim 1, characterized by the following further step:
   transferring the piece products to a third conveying device, which is arranged in the conveying direction of the piece products behind the second conveying device, and on which the piece products are conveyed at a fourth speed that is equal to or faster than the second speed.

7. A device for conveying piece products on one or several tracks, which are arranged side by side and substantially parallel to one another, in such a manner that the piece products are separated out from a single-row product stream into single piece products that are then conveyed further, characterized in that the device operates by using a method as claimed in claim 1, wherein it comprises the following features:
   a first conveying device for feeding the piece products on each of the one or several tracks as a respective single-row product stream at a first speed;
   a second conveying device, which is arranged in the conveying direction of the piece products behind the first conveying device, for receiving the piece products from the first conveying device and for conveying the piece products further at a second speed that is faster than the first speed, wherein the respectively frontmost piece product in the single-row product stream is accelerated when being transferred from the first conveying device to the second conveying device and, as a result, by the gap being formed, is separated off from what remains of the single-row product stream in the conveying direction; and
   at least one of a first or a second entrainment device for aligning the separated respectively frontmost piece product at exactly the precise moment in time and space in the conveying direction on the second conveying device, wherein the at least one of a first or second entrainment device cooperates with the separated respectively frontmost piece product and is moved forward in the conveying direction at a speed which is proportionate to the second speed in such a manner that the at least one of a first or second entrainment device brakes the separated respectively frontmost piece product, conveys it further at the second speed, or accelerates it.

8. The device as claimed in claim 7, characterized in that, the device additionally comprises a third conveying device, which is arranged in the conveying direction of the piece products behind the second conveying device, for receiving and conveying the piece products further at a third speed that is equal to or faster than the second speed, and the device further comprises a first entrainment device, a second entrainment device and a third entrainment device for engagement with the piece products.

9. The device as claimed in claim 8, characterized in that the first, second, and third conveying devices are circulating band conveying devices, belt conveying devices, or chain conveying devices.

10. The device as claimed in claim 8, characterized in that the first, second, and third entrainment devices are attached on circulating drive bands, drive belts or drive chains that are arranged next to the first, second, and third conveying devices.

11. The device as claimed in claim 10, characterized in that one or several entrainment fingers, which are mounted in a stationary manner or so as to be pivotable in a controlled manner in the conveying direction of the piece products, are attached in each case on the circulating drive bands, drive belts, or drive chains of at least one of the first, second, or third entrainment devices.

12. The device as claimed in claim 7, characterized in that at least one of the first or second conveying devices comprise vacuum devices that suck up and hold the piece products on the at least one of the first or second conveying devices.

13. The method for conveying piece products on several tracks which are arranged side by side and substantially parallel to one another, wherein the piece products are separated out from respective individual single-row product streams into single piece products on each of the several tracks and are then conveyed further, characterized by the following steps:
   conveying the piece products on each of the several tracks by way of a method for conveying piece products according to claim 1; and
   controlling at least one of the first conveying device, the second conveying device, a third conveying device, the first entrainment device, the second entrainment device, or a third entrainment device on the several tracks, such that the individual single-row product streams on the several tracks are synchronized with one another in such a manner that in each case, one of the piece products is aligned on a track, after being separated out into single piece products from the respective individual single-row product stream, substantially with the respective piece products on individually selected or all of the other tracks, such that the piece products are arranged substantially in a row side by side on the relevant tracks in a direction perpendicular to or at an angle with respect to the conveying direction of the piece products.

14. A device for conveying piece products on one or several tracks, which are arranged side by side and substantially parallel to one another, in such a manner that the piece products are separated out from a single-row product stream into single piece products that are then conveyed further, characterized in that the device operates by using a method as claimed in claim 13, wherein it comprises the following features:
   a first conveying device for feeding the piece products on each of the one or several tracks as a respective single-row product stream at a first speed;
   a second conveying device, which is arranged in the conveying direction of the piece products behind the first conveying device, for receiving the piece products from the first conveying device and for conveying the piece products further at a second speed that is faster than the first speed, wherein the respectively frontmost piece product in the single-row product stream is accelerated when being transferred from the first conveying device to the second conveying device and, as a result, by the gap being formed, is separated off from what remains of the single-row product stream in the conveying direction; and
   an entrainment device for aligning the separated respectively frontmost piece product at exactly the precise moment in time and space in the conveying direction on the second conveying device, wherein the entrainment device cooperates with the separated respectively frontmost piece product and is moved forward in the conveying direction at a speed which is proportionate to the second speed in such a manner that the entrainment device brakes the separated respectively frontmost piece product, conveys it further at the second speed, or accelerates it.

15. A method for conveying piece products in such a manner that the piece products are separated out from a single-row product stream into single piece products that are then conveyed further at uniform spacings or aligned in groups, characterized by the following steps:

feeding the single-row product stream, formed by the piece products, on a first conveying device at a first speed;

transferring the piece products to a second conveying device, which is arranged downstream relative to the first conveying device in a conveying direction of the piece products and on which the piece products are conveyed at a second speed that is faster than the first speed, wherein the respectively frontmost piece product in the single-row product stream is accelerated when being transferred to the second conveying device and, as a result, by a gap being formed, is separated off from the single-row product stream in the conveying direction; and aligning the now separated respectively frontmost piece product, having a front side and rear side, at exactly the precise moment in time and space in the conveying direction on the second conveying device, with at least one of a first or a second entrainment device, which cooperates with the now separated respectively frontmost piece product and which is moved forward in the conveying direction at a speed that is proportionate to the second speed in such a manner that at least one of the first or second entrainment device is capable of braking the now separated respectively frontmost piece product, conveying the frontmost piece product further at the second speed, or accelerating the frontmost piece product;

accumulating the further products in the single-row product stream on the first conveying device by means of a third entrainment device, once the respectively frontmost piece product of the single-row product stream has been separated from the single-row product stream when being transferred to the second conveying device, releasing of the further products by the third entrainment device for transferring the further products to the second conveying device by the third entrainment device being moved forward in the conveying direction at a fifth speed which is faster than the first speed of the first conveying device, wherein the third entrainment device, together with a second entrainment device, engages in the gap formed between the now separated respectively frontmost piece product and what remains of the single-row product stream, wherein the third entrainment device cooperates in the conveying direction with the front side of the next frontmost piece product in the single-row product stream, and wherein the second entrainment device is moved in a region of the second conveying device in the conveying direction at the fourth speed which is equal to or faster than the second speed of the second conveying device, such that the second entrainment device cooperates in the conveying direction with the rear side of the respectively frontmost piece product separated from the single-row product stream, and as a result pushes the respectively frontmost piece product.

* * * * *